US008913461B2

(12) United States Patent
Steinsiek et al.

(10) Patent No.: US 8,913,461 B2
(45) Date of Patent: *Dec. 16, 2014

(54) TELEVIEWER IMAGE WOOD-GRAIN REDUCTION TECHNIQUES

(71) Applicant: Baker Hughes Incorporated, Houston, TX (US)

(72) Inventors: Roger R. Steinsiek, Houston, TX (US); Jason M. Harris, Houston, TX (US); Jinsong Zhao, Houston, TX (US); Douglas J. Patterson, Spring, TX (US); James B. Domnanish, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/109,553

(22) Filed: Dec. 17, 2013

(65) Prior Publication Data

US 2014/0104978 A1 Apr. 17, 2014

Related U.S. Application Data

(63) Continuation of application No. 12/760,333, filed on Apr. 14, 2010, now Pat. No. 8,634,272.

(60) Provisional application No. 61/171,220, filed on Apr. 21, 2009.

(51) Int. Cl.
*G01V 1/00* (2006.01)

(52) U.S. Cl.
USPC .................. 367/35; 367/69; 181/106

(58) Field of Classification Search
USPC ....................... 367/35, 69; 181/106
See application file for complete search history.

(56) References Cited

U.S. PATENT DOCUMENTS

| 4,780,858 | A | 10/1988 | Clerke |
| 4,796,237 | A | 1/1989 | Hutchens et al. |
| 5,179,541 | A * | 1/1993 | Weido ............... 367/69 |
| 5,212,353 | A * | 5/1993 | Rambow et al. ......... 181/106 |
| 5,469,736 | A | 11/1995 | Moake |
| 5,859,811 | A | 1/1999 | Miller et al. |
| 6,002,639 | A | 12/1999 | Birchak et al. |
| 6,466,513 | B1 | 10/2002 | Pabon et al. |
| 6,778,909 | B1 | 8/2004 | Popovici et al. |
| 8,634,272 | B2 * | 1/2014 | Steinsiek et al. ............ 367/35 |
| 2009/0213690 | A1 | 8/2009 | Steinsiek et al. |
| 2010/0118649 | A1 | 5/2010 | Zhao |

FOREIGN PATENT DOCUMENTS

WO 2007142949 A2 12/2007

* cited by examiner

*Primary Examiner* — Mark Hellner
(74) *Attorney, Agent, or Firm* — Mossman Kumar & Tyler PC

(57) ABSTRACT

Measurements made by a transducer assembly for downhole imaging are affected by reverberations between the transducer and the window on the outside of the assembly. The reverberations result in a stationary noise on the image. Hardware solutions to improve signal-to-noise ratio includes using a composite transducer, adjusting the distance between the transducer and the window. SNR can also be improved by processing techniques that include stacking, fitting a sinusoid to the reverberation, by envelope peak detection, and by applying a notch filter.

18 Claims, 16 Drawing Sheets

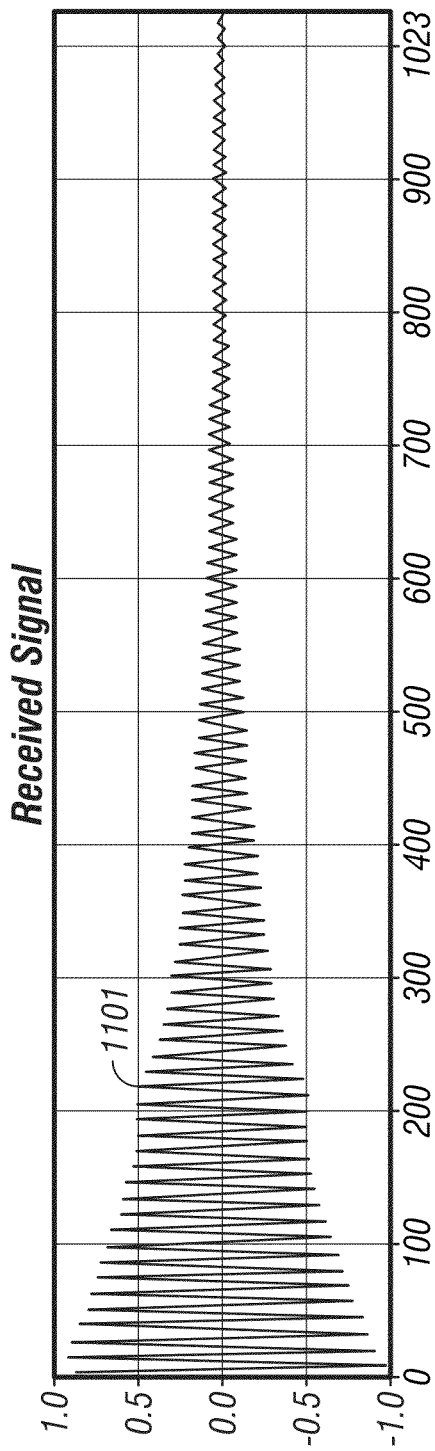
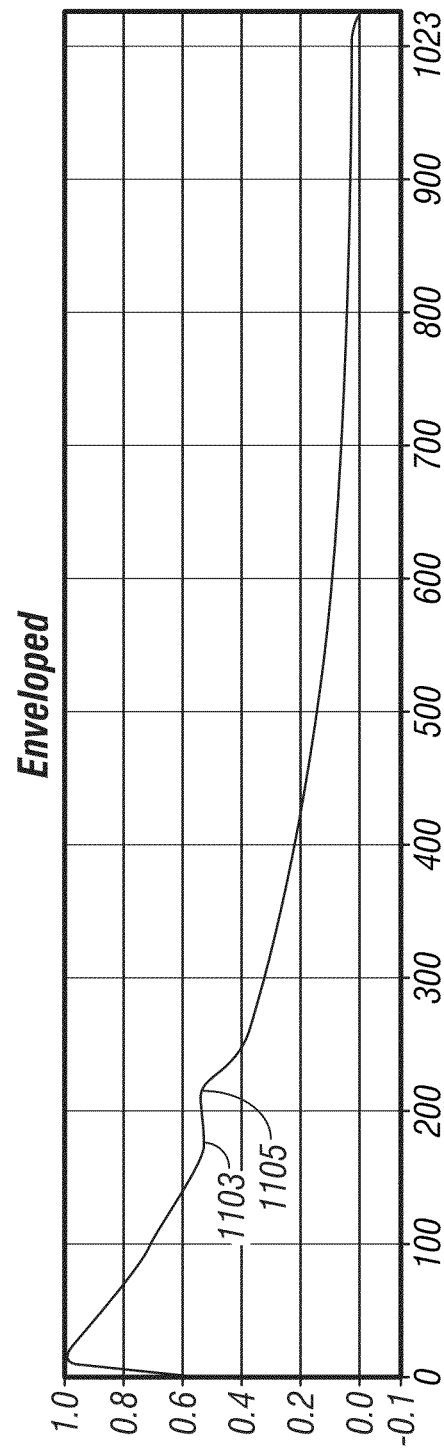

US 8,913,461 B2

TELEVIEWER IMAGE WOOD-GRAIN REDUCTION TECHNIQUES

CROSS-REFERENCE TO RELATED APPLICATIONS

This application is a continuation of application Ser. No. 12/760,333 filed Apr. 14, 2010 which in turn claims priority from U.S. Provisional Patent Application Ser. No. 61/171,220 filed on Apr. 21, 2009, both of which are incorporated herein by reference in their entirety.

FIELD OF THE PRESENT DISCLOSURE

A downhole acoustic logging tool is provided for imaging the texture and structure of the borehole sidewall. The signal components due to transducer ringdown and internal tool reverberations are processed to provide an image in which the "wood-grain" image artifact is reduced.

BACKGROUND OF THE PRESENT DISCLOSURE

Typical acoustic logging tools may include, by way of example, a televiewer which comprises a rotating ultrasonic acoustic transducer that operates in a frequency range on the order of 100 kHz or more. Higher acoustic frequencies are preferred in order to achieve better resolution in the confined space of a borehole. In operation, the televiewer rotates at a desired rate such as 5 to 16 rotations per second to continuously scan the borehole sidewall as the televiewer is drawn up the borehole at a rate that is typically $3/16$ to $3/8$ inch per scan. A beam of acoustic pulses is launched along the normal to the borehole sidewall as the transducer scans the interior surface of the borehole. The pulse rate depends upon the desired spatial resolution such as 1500 pulses per second or 128 to 256 pulses per scan. The insonified borehole sidewall returns pulses reflected therefrom, back to the transducer on a time-multiplexed basis. The reflected acoustic signals are detected, amplified and displayed to provide a continuous picture of the texture and structure of the borehole sidewall. Other application include determination of the goodness of a cement bond to a steel casing as well as monitoring the integrity of the casing itself.

The diameter of a borehole logger is on the order of $2\frac{7}{8}$ in (7.3 cm), so that it can be run in relatively small boreholes. However many borehole diameters are on the order of 10-14" (25.4-35.6 cm) or more so that the length of the acoustic-pulse trajectory from the transducer, through the borehole fluid to the borehole sidewall, may be up to 10" (25.4 cm). In the normal course of events, the borehole fluid is contaminated by drill cuttings, air bubbles and foreign matter which severely attenuate the acoustic energy by scattering because the physical dimensions of the contaminants are comparable to the wavelength of the wavefields emitted by the transducer.

The televiewer signal is also contaminated by stationary noise. The stationary noise is due to the transducer ringing and the reverberations between the face of the transducer and a window on the outside of the televiewer assembly. The echo signal is the signal returned from the borehole formation or casing. Neglecting borehole fluid attenuation, deflection, diffraction, and window insertion loss, the amplitude of the echo signal is a function of the acoustic impedance of the formation or casing. The arrival time of the echo signal within the process window will change with the instruments centralization and the shape of the borehole. As the echo signal moves in time, it is modulated by the stationary noise, therefore the detected peak amplitude is a function of the formation reflection, and the position of the echo within the process window. If the S/N ratio is low enough, the modulation causes the resulting televiewer amplitude image to be dominated by the periodic "wood grain" interference pattern. A physical explanation of the "wood grain" is that the transducer ringing and reverberation noise is initiated when a pulse-echo signal is transmitted, so that the noise is stationary with respect to the echo signal. Strictly speaking, the term "ringdown" refers to the ringing of the transducer when it is activated. Reverberation refers to the sound that reflects back and forth between the transducer and window. Interference between the ringdown and reverberation noise and the echo signals results in a "wood grain" pattern on the amplitude image. The present disclosure addresses the problem of reducing the "wood grain" effects by improvements to the televiewer assembly, detecting the signal independently of the noise in real time, and/or filtering the stationary noise post acquisition.

SUMMARY OF THE PRESENT DISCLOSURE

One embodiment of the disclosure is an apparatus configured to evaluate an earth formation. The apparatus includes a rotatable transducer assembly; a transducer on the rotatable transducer assembly configured to propagate an acoustic signal through an acoustically transparent window into a borehole and produce a signal including a echo from a wall of the borehole and a ringdown signal within the transducer assembly; and at least one processor configured to use the signal produce at a plurality of orientations of the transducer during rotation of the transducer assembly to provide a two-dimensional image of the earth formation, the two-dimensional image being substantially free of a stationary noise resulting from an interference between the ringdown signal and the echo.

Another embodiment of the disclosure is a method of evaluating an earth formation. The method includes: conveying a rotatable transducer assembly into a borehole; using a transducer on the rotatable transducer assembly to convey an acoustic signal through an acoustically transparent window into a borehole and produce a signal including en echo from a wall of the borehole and a ringdown signal within the transducer assembly; and processing the signal produced at a plurality of orientations of the transducer during rotation of the transducer assembly to provide a two-dimensional image of the earth formation, the two-dimensional image being substantially free of a stationary noise resulting from interference between the ringdown signal and the echo.

Another embodiment of the disclosure is a computer-readable medium product having stored thereon instructions that when executed by at least one processor, cause the at least one processor to perform a method. The method includes: using a signal produced by a transducer on a rotating transducer assembly in a borehole, the signal including an echo from a wall of the borehole and a ringdown signal within the rotating transducer assembly at a plurality of orientations of the transducer assembly, for providing a two-dimensional image of the earth formation, the two-dimensional image being substantially free of a stationary noise resulting from the ringdown signal.

BRIEF DESCRIPTION OF THE DRAWINGS

The present disclosure is best understood with reference to the accompanying figures in which like numerals refer to like elements and in which:

FIG. 11A shows an exemplary signal dominated by a ringdown;

FIG. 11B shows the envelope of the signal in FIG. 10a;

DETAILED DESCRIPTION OF ILLUSTRATIVE EMBODIMENTS

Figure 1:
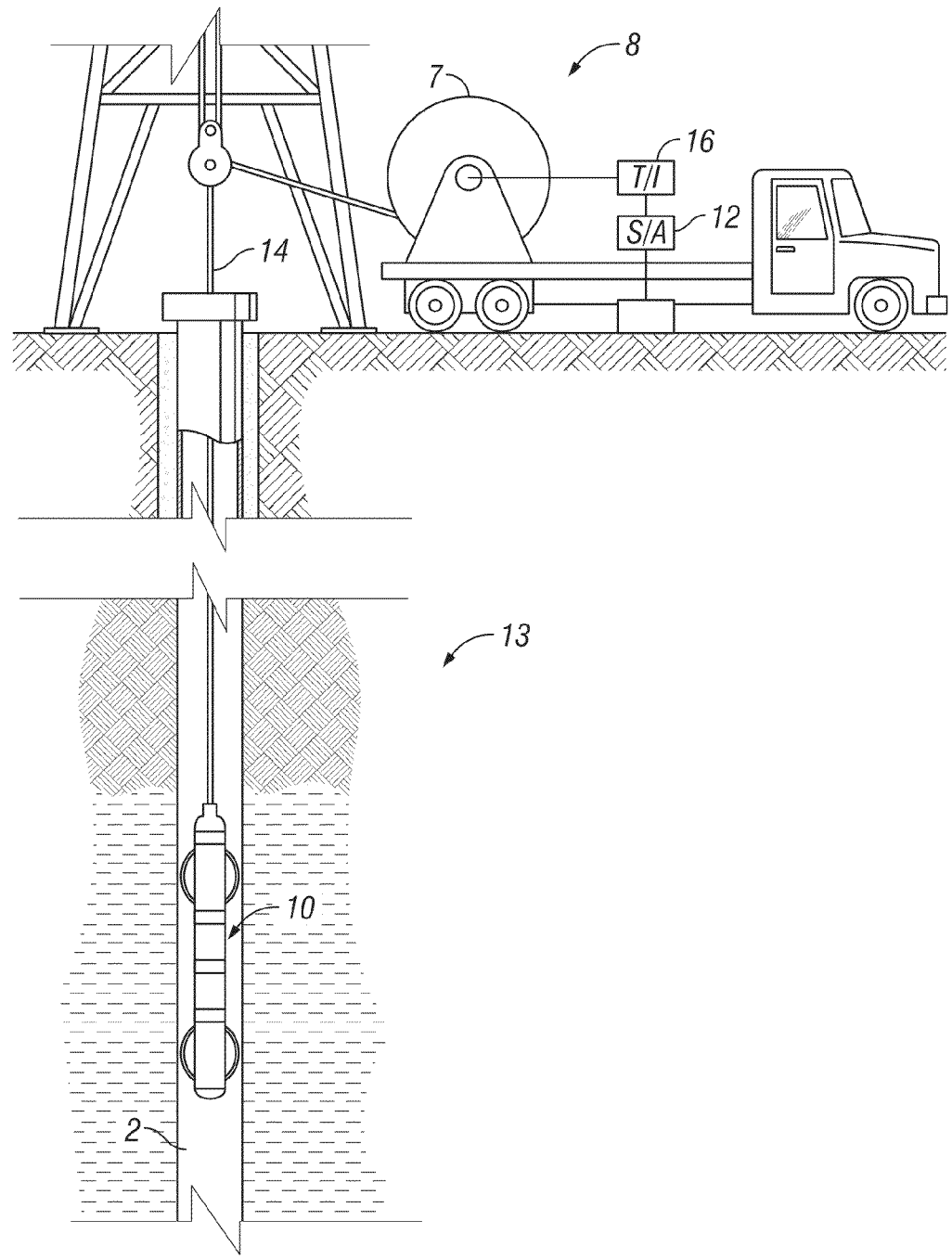
FIG. 1 shows an imaging well logging instrument disposed in a wellbore drilled through earth formations.

Referring to FIG. 1, a well logging instrument 10 is shown being lowered into a wellbore 2 penetrating earth formations 13. The instrument 10 can be lowered into the wellbore 2 and withdrawn therefrom by an armored electrical cable 14. The cable 14 can be spooled by a winch 7 or similar device known in the art. The cable 14 is electrically connected to a surface recording system 8 of a type known in the art which can include a signal decoding and interpretation unit 16 and a recording unit 12. Signals transmitted by the logging instrument 10 along the cable 14 can be decoded, interpreted, recorded and processed by the respective units in the surface system 8.

Figure 2A:
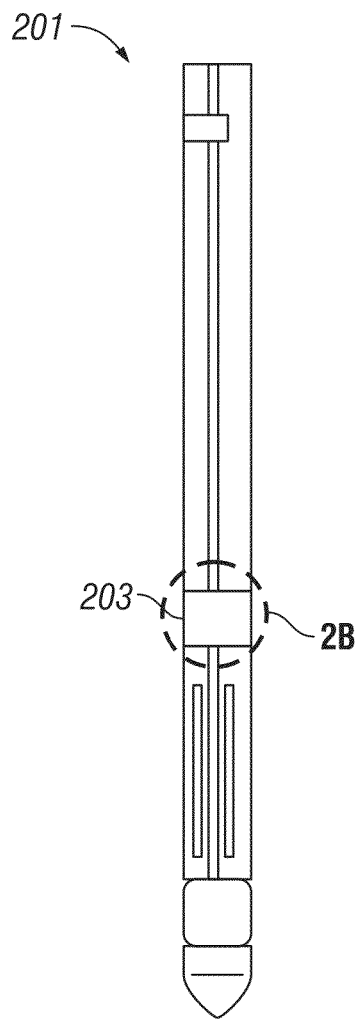
FIG. 2A shows the rotator assembly.
Figure 2B:
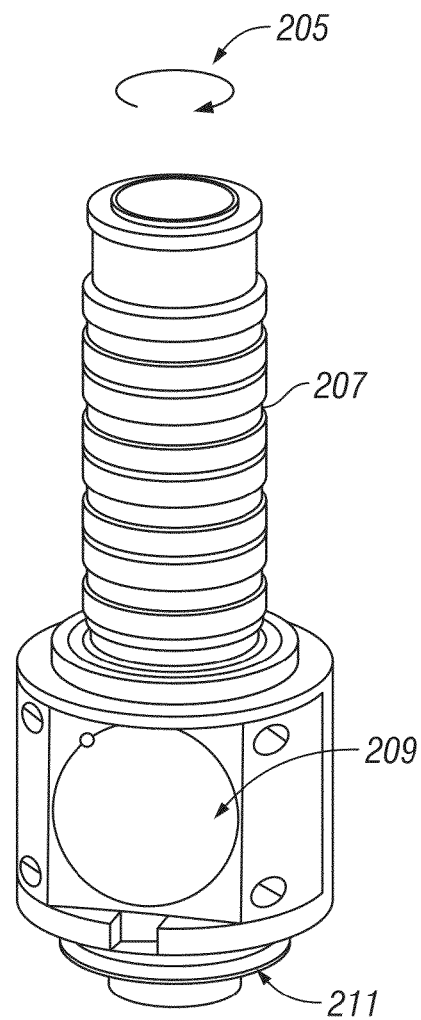
FIG. 2B shows the transducer assembly.

FIG. 2A shows mandrel section 201 of the imager instrument with a Teflon® window 203. Shown in FIG. 2B is the rotating platform 205 with the ultrasonic transducer assembly 209. This may be referred to as a rotatable transducer assembly. The rotating platform is also provided with a magnetometer 211 to make measurements of the orientation of the platform and the ultrasonic transducer. The platform is provided with coils 207 that are the secondary coils of a transformer that are used for communicating signals from the transducer and the magnetometer to the non-rotating part of the tool. The transducer 209 is discussed further below.

Figure 3:
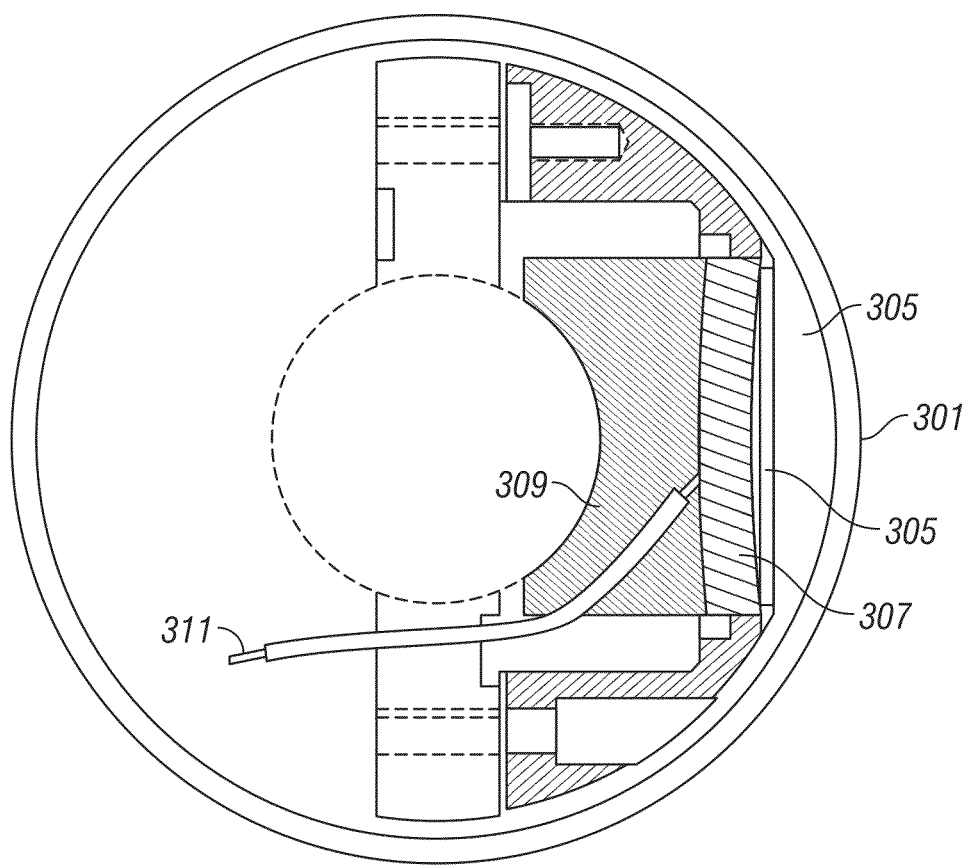
FIG. 3 illustrates a cross-section of the transducer assembly.

Turning now to FIG. 3, a cross section of a transducer assembly is shown. Depicted therein is the Teflon® window 301. One transducer is depicted by 307. The assembly may include a second transducer on the opposite side (not shown). The front portion of the transducer is in contact with an impedance matching material 305 that is used to match the impedance of the transducer with that of oil in the space 305 between the transducer and the Teflon® window. It should be noted that the use of Teflon® is not to be construed as a limitation and any other material with the necessary abrasion resistance and acoustic propertied could be used.

Still referring to FIG. 3, the transducer assembly also includes a backing material 309. In one embodiment, the backing material is a 0-3 composite of tungsten particles in high temperature rubber. In another embodiment, liquid Viton®, a synthetic rubber may be used. The backing material absorbs acoustic signals propagating from the transducer away from the borehole wall and reduces reflections from the interface between the transducer and the backing material. Also shown in FIG. 3 are the leads 311 from the transducer that go to transformer coils 207. The transducer 307 sends an acoustic signal through the acoustically transparent Teflon® window. The borehole wall produces an echo signal that returns to the rotatable transducer assembly 209.

Figure 4B:
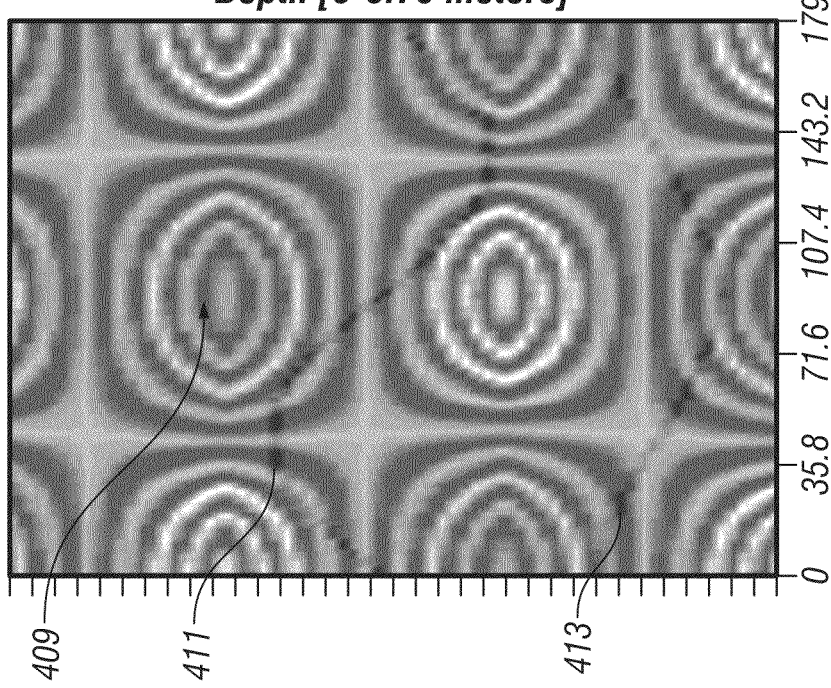
FIG. 4B shows an exemplary amplitude image of the borehole wall dominated by an interference between the transducer ringdown and the echo signal, giving a characteristic "wood-grain" image.
Figure 4A:
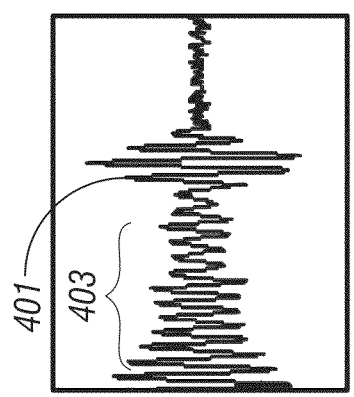
FIG. 4A shows an exemplary signal resulting from activation of the transducer.

A problem encountered with televiewer signals is that of reverberations within the transducer assembly, specifically between the transducer 307 and the Teflon® window 301. FIG. 4A shows an exemplary signal recorded with a rotatable transducer assembly 209. The reflection from the borehole wall is indicated by 401 while the extended signal 403 results from ringdown of the transducer. As a result of interference between this ringdown and the echo signal, the amplitude image of the borehole wall has the character shown in FIG. 4B. The abscissa of the two-dimensional image of FIG. 4b is depth and the ordinate is the azimuth: the borehole wall has been "unwrapped" to give the image. The actual reflection signals from the borehole wall corresponding to two dipping beds or fractures are shown by 411 and 413. The image is dominated by a "wood-grain" pattern 409 which makes the identification of the dipping beds difficult.

Figure 5B:
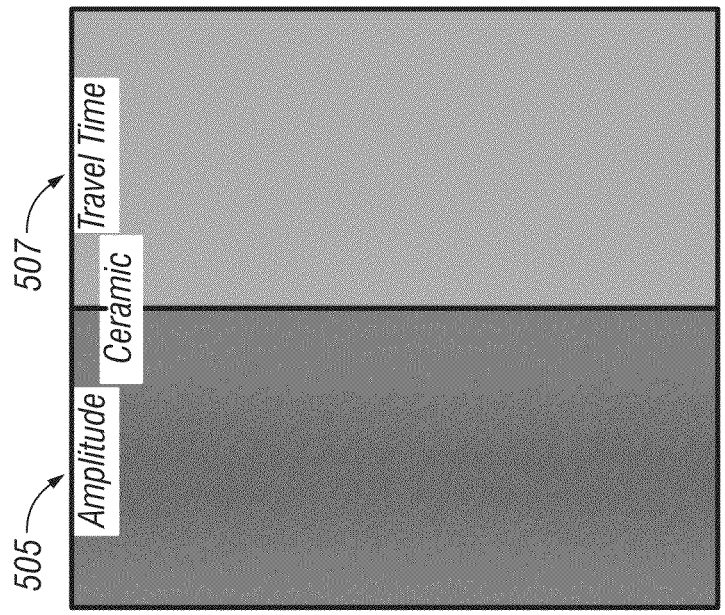
FIG. 5B shows the amplitude and traveltime images obtained using a composite transducer in heavy water-based mud.
Figure 5A:
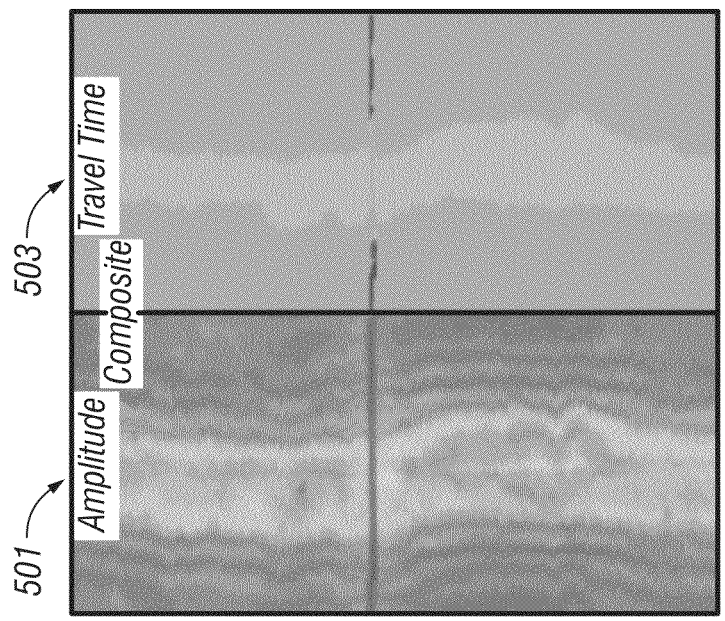
FIG. 5A shows the amplitude and traveltime images obtained using a ceramic transducer in heavy water-based mud.

In the present disclosure, several methods are disclosed for improving the signal-to-noise ratio of the desired signal (exemplified by 411) and the noise (exemplified by 409). The first solution is a hardware solution and is based upon using a transducer that has improved signal output. Specifically, a composite transducer of the type disclosed in U.S. patent application Ser. No. 12/392,487 of Steinsiek et al., having the same assignee as the present disclosure and the contents of which are incorporated herein by reference, is used. The transducer disclosed therein comprises a 1-3 Piezoelectric composite transducer of high Q ceramic rods in a polymer matrix. A comparison of signals recorded in a borehole with a prior art ceramic transducer (FIG. 5B) and the composite transducer (FIG. 5A) in heavy water-based mud (18.2 ppg) is informative. The amplitude image 505 and the traveltime image 507 recorded with the ceramic transducer show basically no reflected signal. In contrast, the amplitude image 501 and the traveltime image 503 with the composite transducer shows a near vertical feature 521 indicative of borehole ellipticity. Based on experience with the composite transducer, it is estimated that the signal to noise ratio (SNR) can be increased by about 20 dB by using a composite transducer. An explanation of the reduction in ringdown is that reverberations are dampened by the polymer matrix portion of the transducer Another hardware solution is to alter the distance between the transducer and the window. Changes in the reverberatory signal resulting from different distances have been discussed in Steinsiek but specific examples of improvements in image quality were not discussed. Based on experience with the composite transducer at different distances from the window, it is estimated that the SNR can be improved by about 8 dB.

Figure 6A:
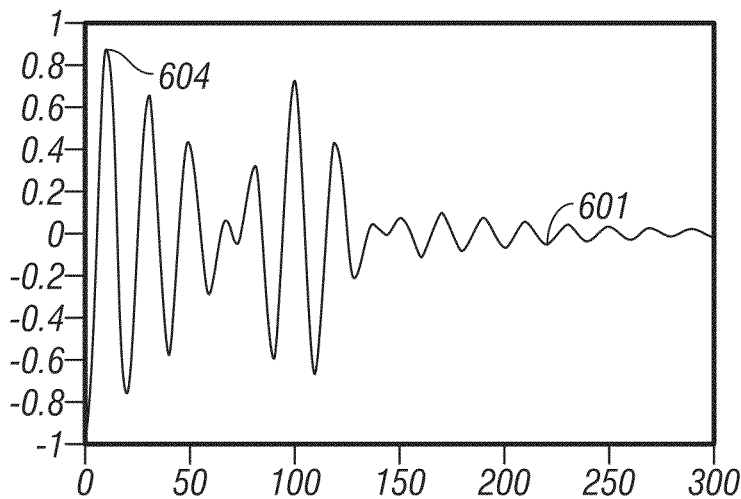
FIG. 6A shows an exemplary signal including a ringdown and an echo signal.
Figure 6B:
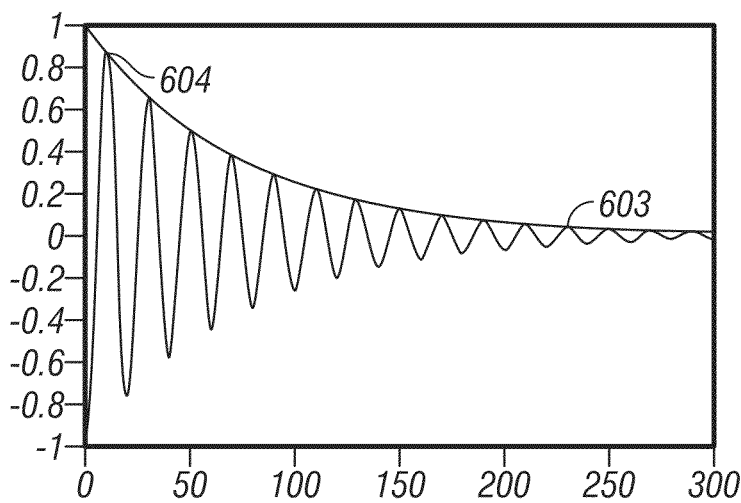
FIG. 6B is an estimate of the ringdown obtained by fitting a sinusoid.
Figure 6C:
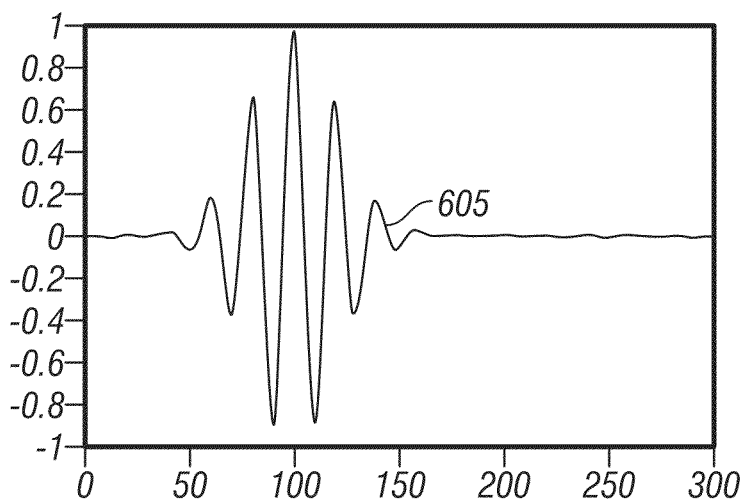
FIG. 6C shows the estimated echo signal obtained by subtracting the fitted sinusoid from the recorded signal.
Figure 7A:
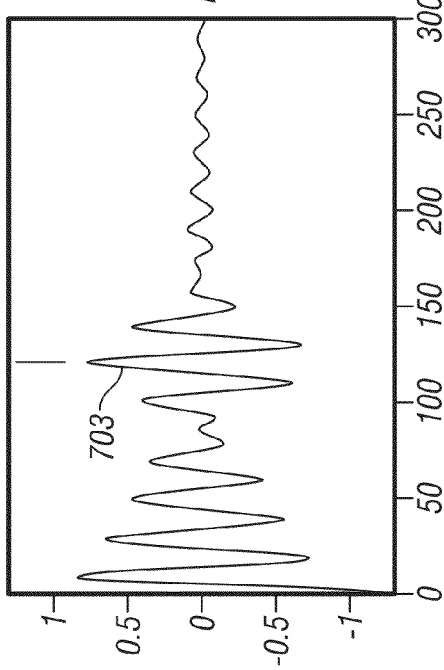
FIGS. 7A-D shows four exemplary recorded signals, each including an echo and a ringdown.
Figure 7B:
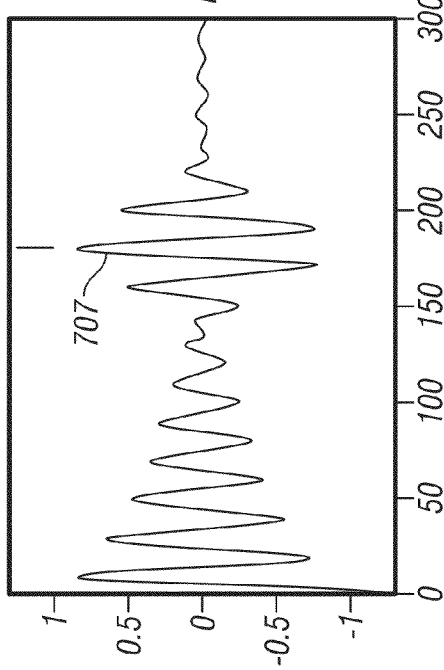
Figure 7C:
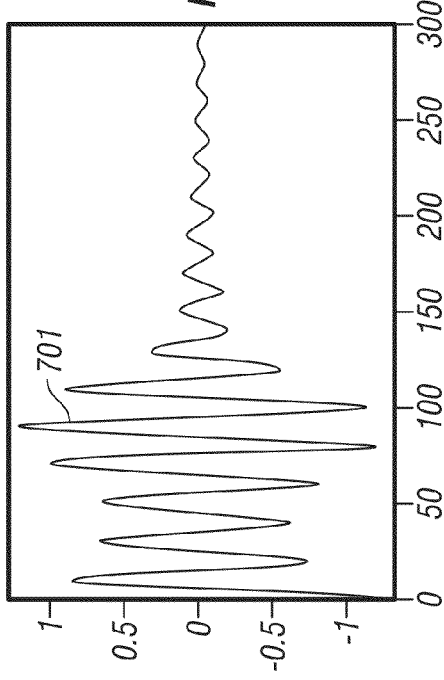
Figure 7D:
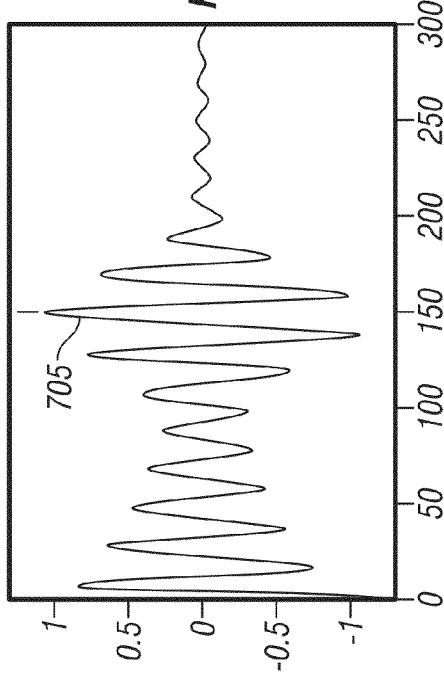
Figure 7E:
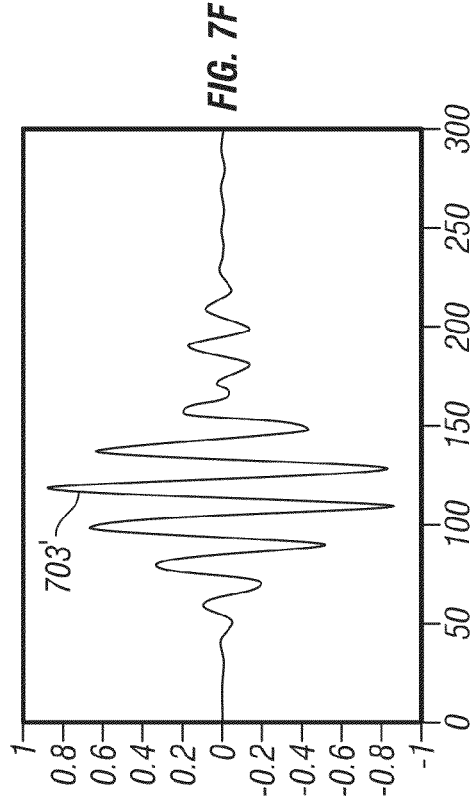
FIGS. 7E-H shows the results of subtracting the average of the signals in FIGS. 7a-d from the individual signals.
Figure 7F:
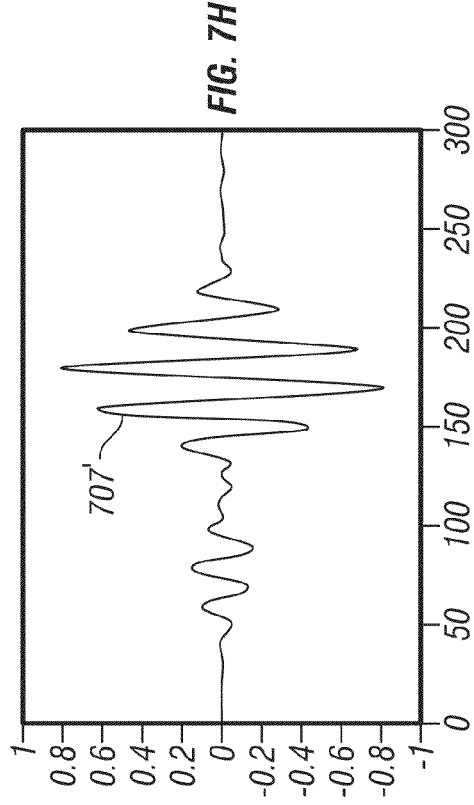
Figure 7G:
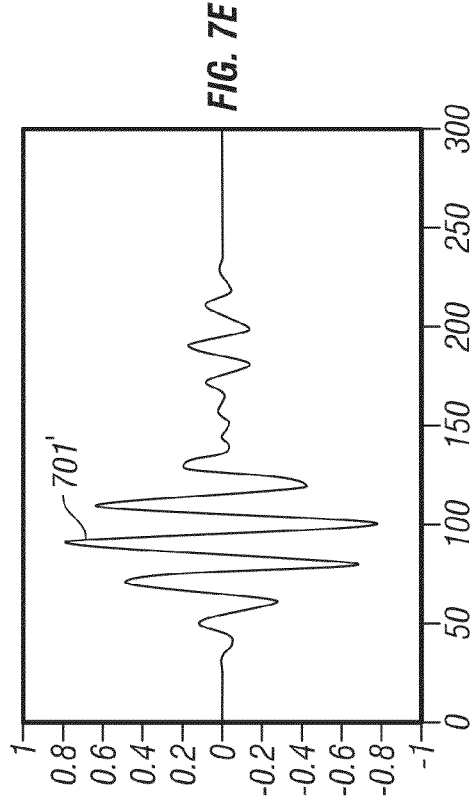
Figure 7H:
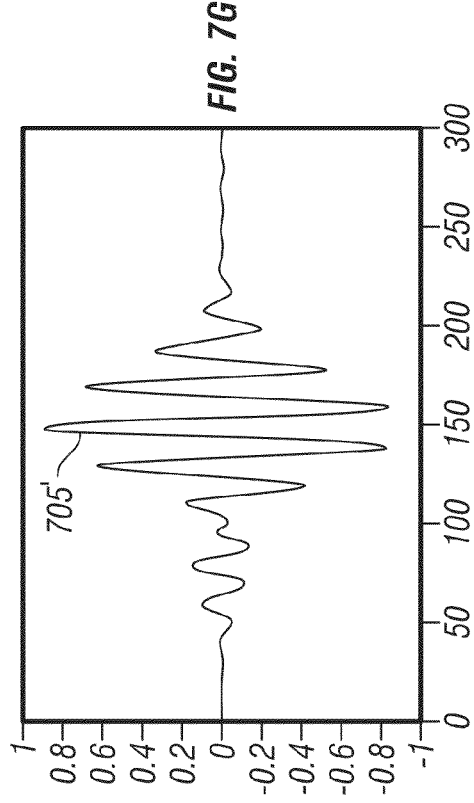

Turning now to FIGS. 6A-6C, a processing method to improve the SNR is discussed. FIG. 6A shows an exemplary signal 601 that includes an echo distorted by ringdown. In this example, the echo is centered around 100 on the x-axis. FIG. 6B shows an estimate 603 of the ringdown signal obtained by fitting a decaying sinusoid to the signal 601. In one example, the fitting function is of the form:

$$e^{-\zeta t}\sin(\omega t-\phi)$$

where the fitting parameters are the decay constant $\zeta$, frequency $\omega$, and phase $\phi$. In one embodiment of the disclosure, a constrained fit is done so that the curve 603 passes through the first peak 604 of the curve 601. Subtracting the decaying sinusoidal fit 603 from the recorded signal 601 gives the estimated echo signal 605. This process of fitting and subtracting (FAS) is repeated for each of the transducer excitations at the plurality of transducer orientations and processed to give amplitude and traveltime images.

Another method of processing the data is discussed with reference to FIGS. 7A-H. Four exemplary signals 701, 703, 705, 707 are shown in FIGS. 7A-D. The signals include ringdown and an echo signal at time 90, 120, 150 and 180 respectively. The average ("stack") of the produced signals 701, 703, 705, 707 is determined (not shown) and subtracted from the individual signals 701, 703, 705, 707 to give the signals 701', 703', 705', 707' respectively, shown in FIGS. 7E-H. As can be seen, the subtracted signals agree very well with the echo times of 90, 120, 150 and 180.

Figure 8A:
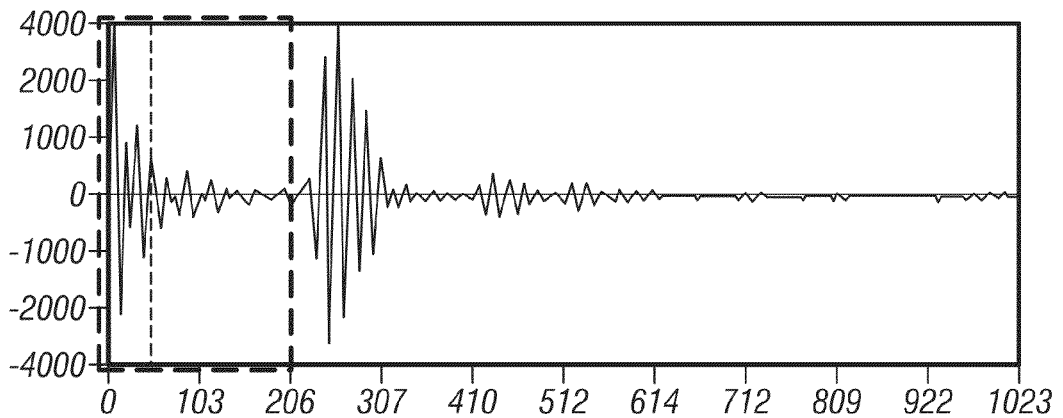
FIGS. 8A-8C show the results of processing a signal including a ringdown using ABS, Stack and subtract, and Fit and subtract respectively.
Figure 8B:
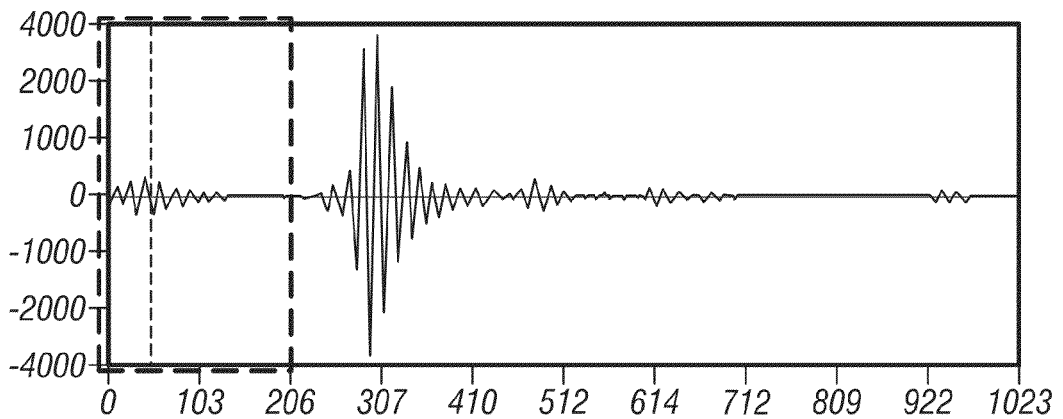
Figure 8C:
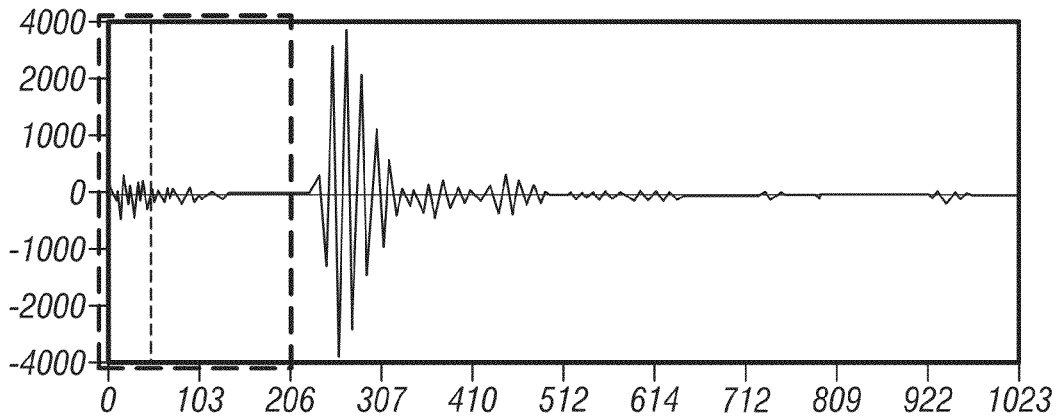

FIG. 8A shows the results of processing a signal including a ringdown using the ABS method. FIG. 8B shows the result of processing using SAS (Stack and Subtract) and ABS. FIG. 8C shows the result of FAS (Fit and Subtract), SAS and ABS.

Figure 9A:
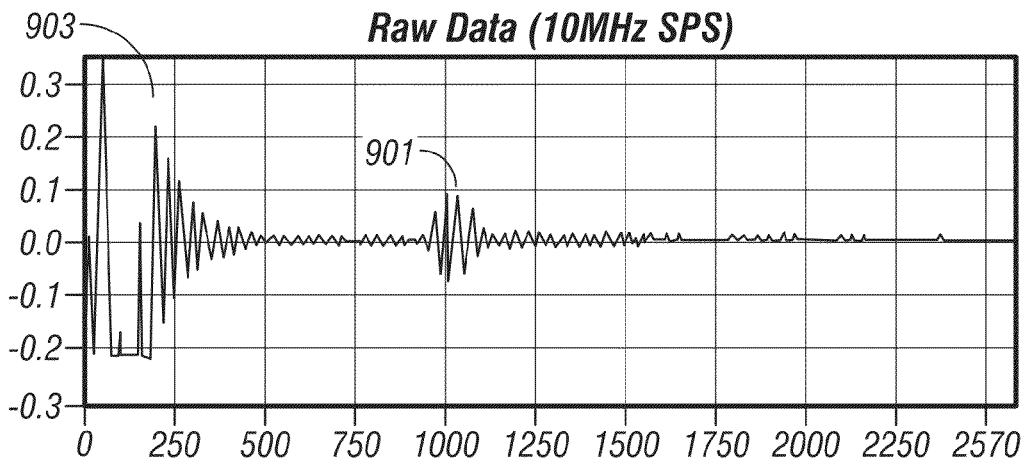
FIGS. 9A-9C show exemplary signals including a ringdown and an echo at different spacings from the ringdown.
Figure 9B:
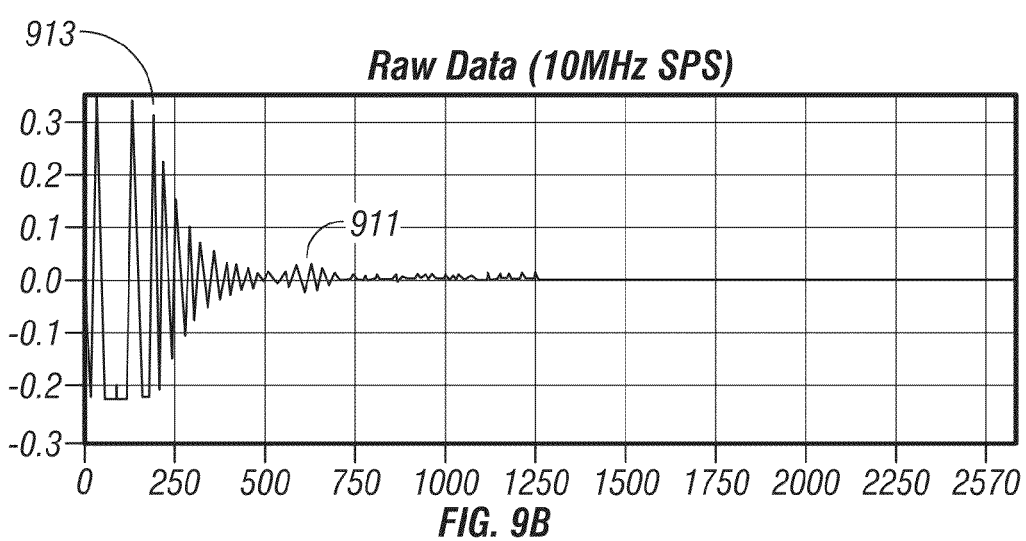
Figure 9C:
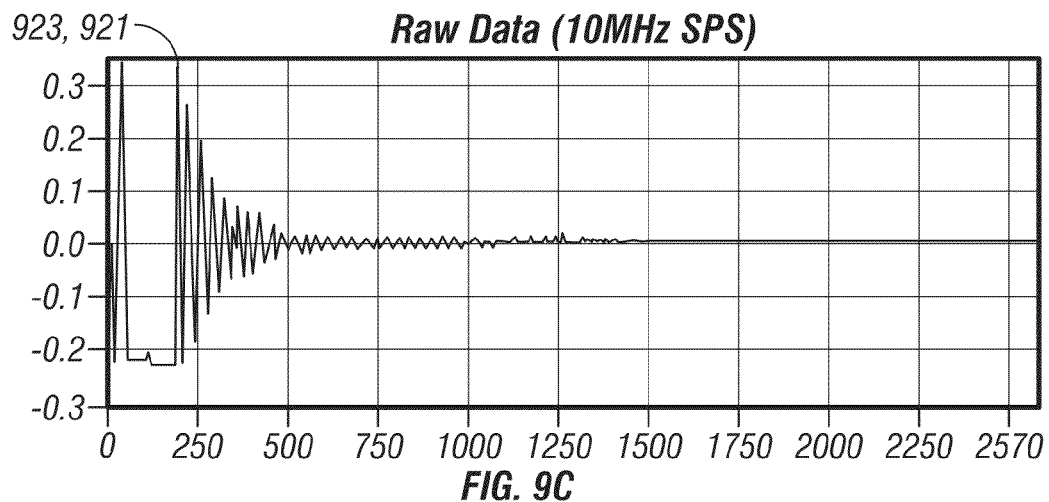

Another method of processing the data uses echo peak detection methods discussed in U.S. patent application Ser. No. 12/268,141 of Zhao, having the same assignee as the present disclosure and the contents of which are incorporated herein by reference. The method of Zhao is discussed with reference to FIGS. 9A-9C. Shown in FIG. 9A is a ringdown signal 903 and an echo 901. The echo can be clearly distinguished from the ringdown. In FIG. 9B, the echo 911 is barely visible relative to the ringdown 913 and in FIG. 9C, the echo 921 is swamped by the ringdown 923.

Figure 10:
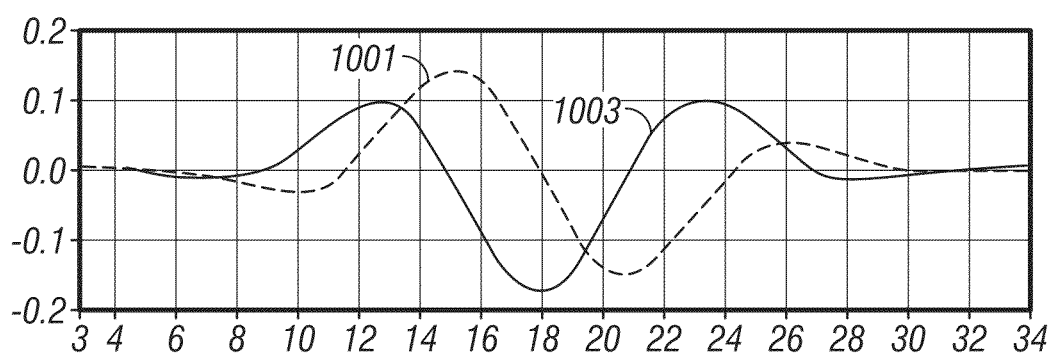
FIG. 10 shows the Cauchy wavelet pair for the Hilbert Transform

The method used in the present disclosure is to use the Hilbert Transform to estimate the envelope of the recorded signal and then identify arrival times as peaks in the envelope that are indicative of the echo signal. As discussed in Zhao, the Hilbert transform is implemented in conjunction with a Cauchy wavelet (a modulated Gaussian filter) as a bandpass filter. For the particular transducer used, a wavelet is defined having 5-6 cycles of a center frequency of 300 kHz, a sampling interval of 4 MHz. Due to hardware constraints, the wavelet is truncated, and a Hanning weighting is used to reduce the Gibbs phenomenon. The resulting wavelet pair for applying the Hilbert transform is shown in FIG. 10 by the in-phase 1003 and quadrature 1001 wavelets.

FIG. 11A shows an exemplary signal 1101 completely dominated by the ringdown. FIG. 11B shows the envelope 1103 obtained by applying the wavelets 1001, 1003. The perturbation 1105 is associated with the echo signal. Those versed in the art and having benefit of the present disclosure would recognize that peak finding techniques would not always be able to detect the echo. Accordingly, in one embodiment of the disclosure, the first and second moments are removed from the envelope curve using a Laplace Operator. The Laplace operator may be denoted by:

$$\nabla^2 = \frac{d^2}{dt^2}. \qquad (1)$$

This filter is very sensitive to high frequency noise, so that a low pass filtering may be applied prior to the Laplace operator. In one embodiment of the disclosure, a Gaussian filter is used, so that the combination of the Gaussian-Laplace operator may be denoted by:

$$\nabla^2 \cdot g(t) = \frac{d^2}{dt^2} e^{-\left(\frac{t}{\tau}\right)^2}. \qquad (2)$$

Figure 12:
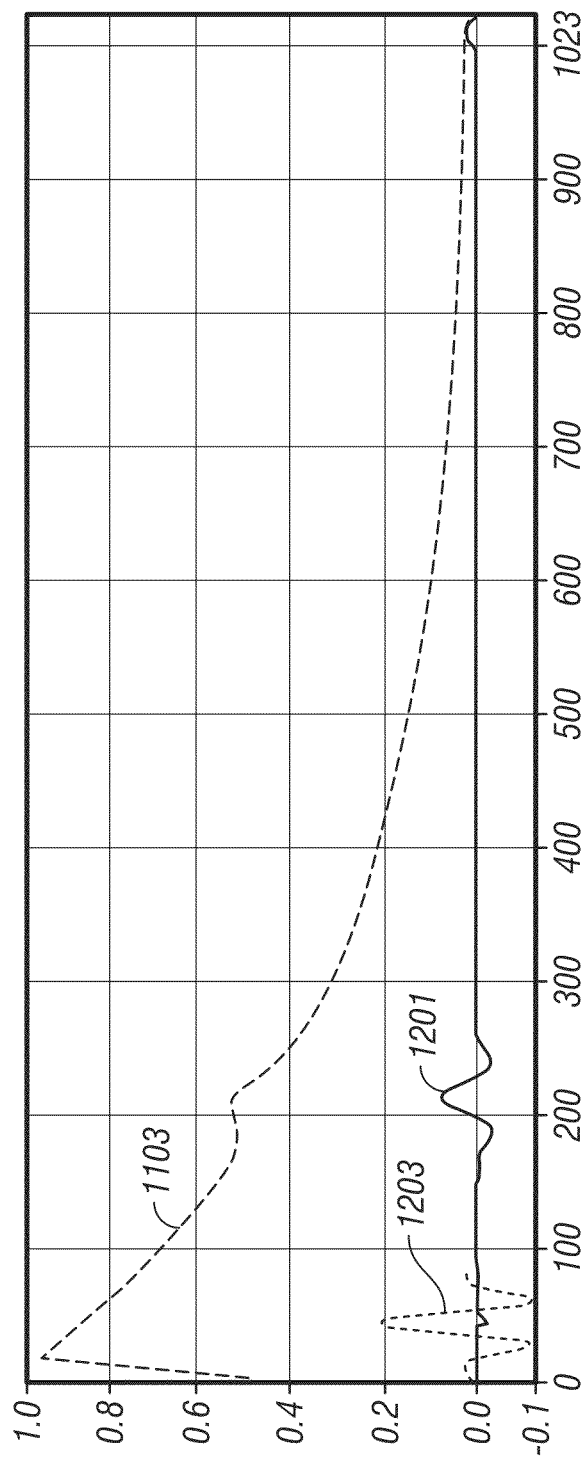
FIG. 12 shows the envelope along with the result of applying a Gaussian Laplace operator.

FIG. 12 shows the results of applying the Gaussian Laplace operator to the envelope 1103. The echo signal 1201 can be clearly seen, separate from the ringdown signal. For the purposes of display of the borehole image, the amplitude of the echo is defined by the difference between the peak and the average of the adjacent troughs. The time is defined by the time of the peak.

Figure 13:
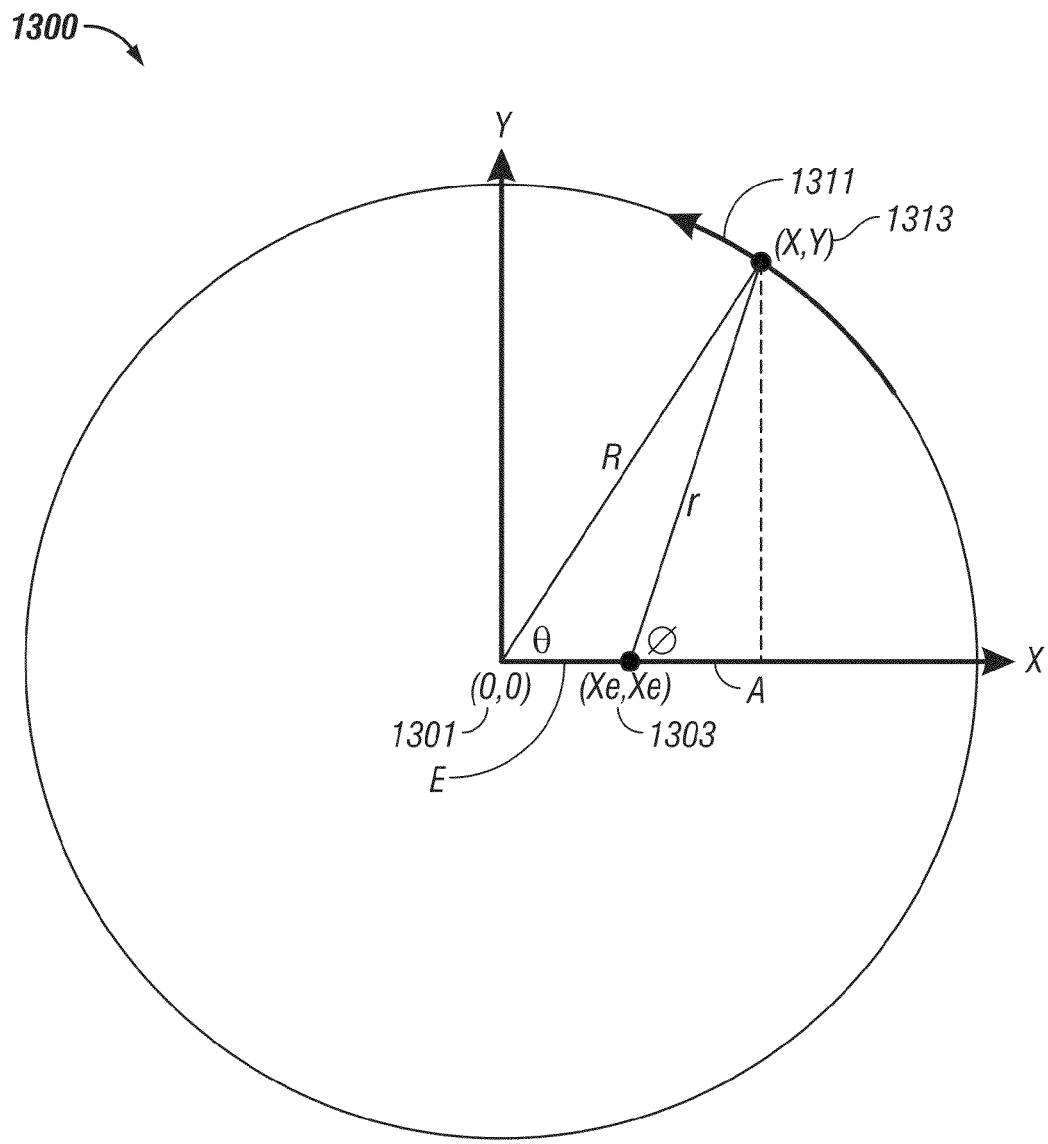
FIG. 13 shows the geometry of an eccentric rotating transducer in a circular borehole.

Another embodiment of the disclosure uses a notch filtering operation to remove the effect of the reverberation. The geometry that causes the reverberation is shown in FIG. 13. The transducer 1303 is positioned in a circular borehole 1300 of radius R and is offset by a distance E from the center of the borehole. At an angle $\phi$ of the transducer, the point 1313 at a distance r from the transducer defines the two-way traveltime for the reflected transducer signal. The direction of rotation of the acoustic beam is indicated by 1311.

When E≠0 the radial length of the ultrasound beam r changes as a function of θ. The change in r between each azimuth location is expressed as dr/dθ. If tr is the time between each azimuth location, then the change in r between each azimuth location is given by dr/dtr. dr is determined by the instruments radial distance measurement, and dtr is determined by the instruments transmit timing. The stationary noise and the moving ultrasound echo constructively interfere to create peaks in the detected line scan data every wavelength (λ). Due to the pulse-echo technique, for every half-wavelength (λ/2) change in r, the two-way distance changes a full wavelength (λ).

Therefore, the period of interference Pi=((λ/2)/dr)·dtr

This gives the instantaneous frequency of the interference between the ringdown signal and the echo as:

$$fi=(2 \cdot dr/\lambda)/dtr=(2/\lambda)\cdot dr/dtr=(2/\lambda \cdot dtr)\cdot dr$$

An adjustable notch filter tuned to this frequency can be used to filter out the interference without filtering out the signal variation due to the formation features.

Figure 14A:
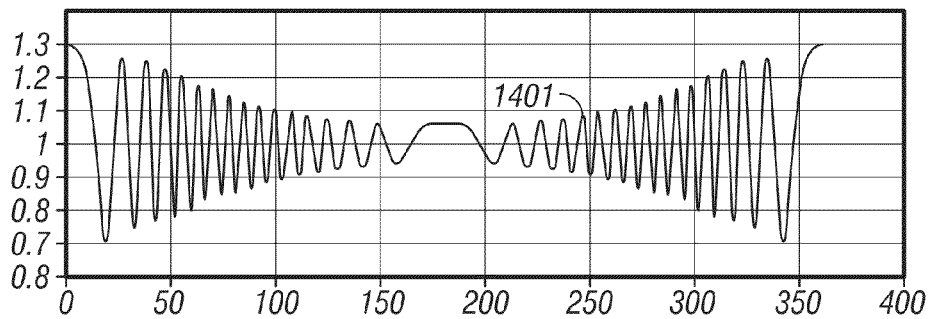
FIG. 14 shows the effect of eccentering of the transducer in a circular borehole; (a) shows the peak amplitude as a function of azimuth as a result of eccentering of the transducer by 24 mm in a borehole of diameter 108 mm, (b) shows the woodgrain effect, and (c) shows the spectrum of the woodgrain effect.
Figure 14B:
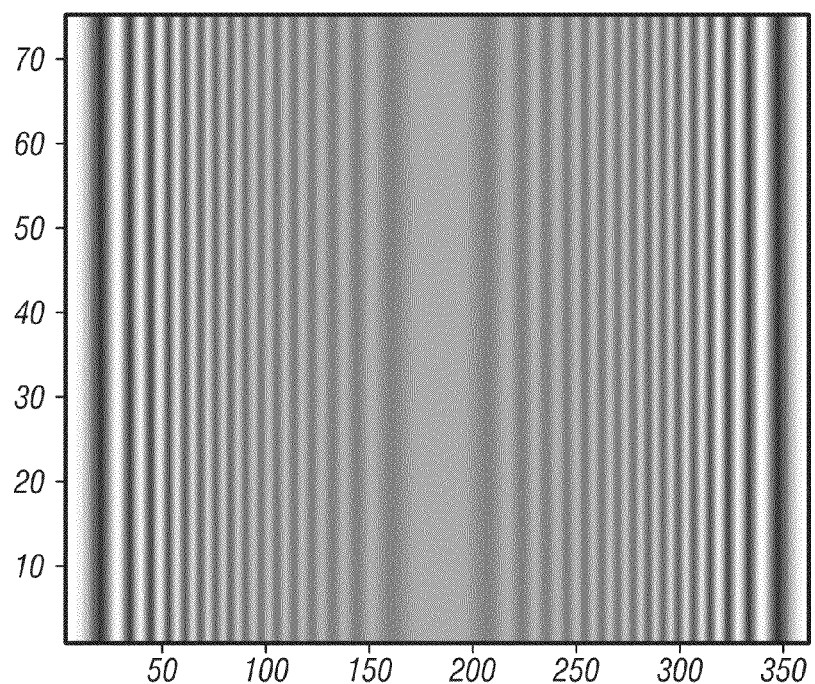
Figure 14C:
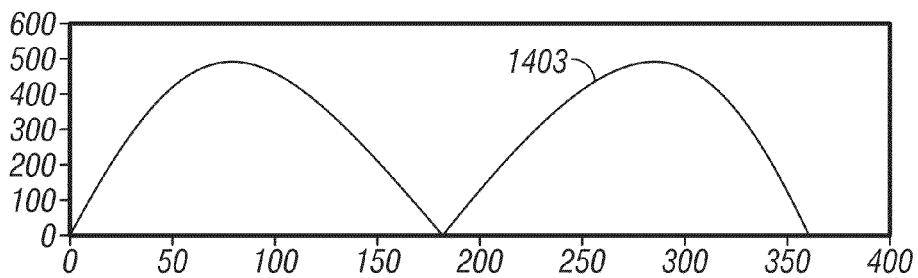

The curve 1401 in FIG. 14*a* gives the peak value of the reflected signal as the transducer rotates through 360°. FIG. 14*b* shows the modeled reflected amplitude over a portion of the borehole of uniform radius. Using known methods, the instantaneous frequency of the reflected signal can be estimated. The instantaneous frequency is the result of interference between the generated signal (having a known base frequency) and a modulating signal caused by the interference, i.e., it will have components at the sum snd difference of the base frequency and the modulating frequency. The modulating frequency recovered is indicated by 1403. A corresponding notch filter is applied to the recorded signal as a function of azimuth to get rid of the reverberation.

Figure 15B:
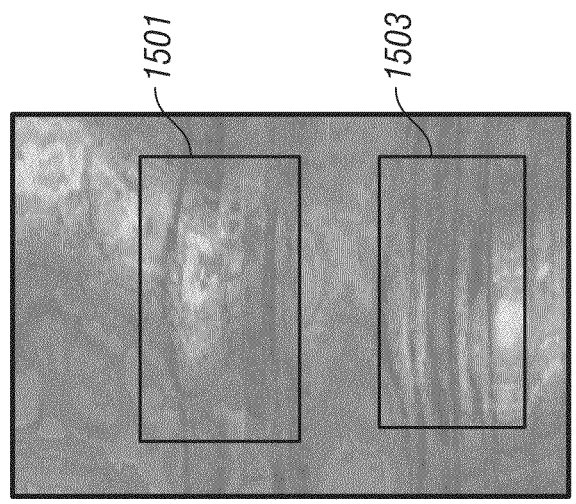
FIGS. 15A-15B show a comparison of amplitude images obtained without downhole waveform processing and with stack-and-subtract waveform processing.
Figure 15A:
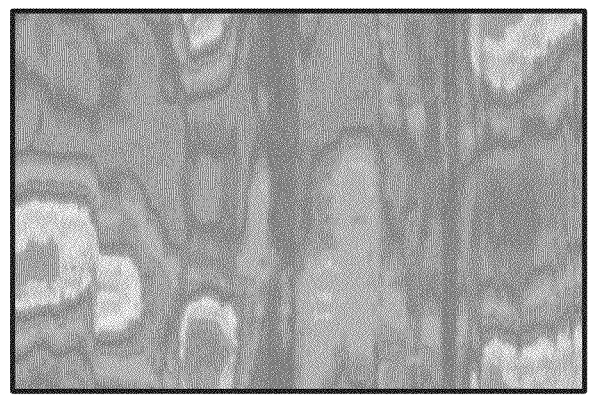

FIG. 15A shows an exemplary amplitude image recorded downhole and displayed without any downhole processing. FIG. 15B shows the results of using SAS processing. Significant improvement is noted in the resolution of the bedding in the regions indicated by 1501 and 1503. In fact, the estimated dip direction is opposite to that which would be inferred from the unprocessed section. The stationary noise of the woodgrain effect has been greatly attenuated. To the extent that the underlying formation bedding is visible in the image, it can be said that the stationary noise due to interference between the ringdown signal and the echo has been substantially eliminated.

The processing of the data may be done by a downhole processor and/or a surface processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks. Such media may also be used to store results of the processing discussed above.

What is claimed is:

1. An apparatus configured to evaluate an earth formation from acoustic signals propagated into a borehole, the apparatus comprising:
   a transducer configured to produce a signal including a ringdown signal and an echo from a wall of the borehole from a plurality of orientations; and
   at least one processor configured to adjust the signal produced for each of the plurality of orientations using an estimation of the ringdown signal to increase a signal-to-noise ratio associated with the signal and use the adjusted signal to provide a two-dimensional image of the earth formation such that the two-dimensional image is substantially free of a stationary noise resulting from an interference between the ringdown signal and the echo.

2. The apparatus of claim 1 wherein the at least one processor is further configured to provide the two-dimensional image by:
   (i) fitting a decaying sinusoid to the produced signal for each of the plurality of orientations,
   (ii) subtracting the decaying sinusoid from the produced signal for each of the plurality of orientations to give a plurality of processed signals, and
   (iii) using the plurality of processed signals to provide the image.

3. The apparatus of claim 1 wherein the at least one processor is further configured to provide the two-dimensional image by:
   (i) determining an average of the produced signals for the plurality of orientations,
   (ii) subtracting the average of the produced signals from the produced signal for each of the plurality of orientations to give a plurality of processed signals, and
   (iii) using the plurality of processed signals to provide the two-dimensional image.

4. The apparatus of claim 1 wherein the at least one processor is further configured to provide the two-dimensional image by:
   (i) bandpassing the produced signal for each of the plurality of orientations using a modulated Gaussian filter and providing a bandpassed signal for each of the plurality of orientations;
   (ii) estimating an envelope of the bandpassed signal for each of the plurality of orientations;
   (iii) estimating from the envelope of the bandpassed signal for each of the plurality of orientations an arrival time of the echo for each of the plurality of orientations and an associated amplitude for each of the plurality of orientations; and
   (iv) producing the image using at least one of: (i) the estimated arrival time for each of the plurality of orientations, and (ii) the estimated associated amplitude for each of the plurality of orientations.

5. The apparatus of claim 1 wherein the at least one processor is further configured to provide the two-dimensional image by:
   (i) estimating a frequency of an interference between the ringdown signal and the echo as a function of azimuths, and
   (ii) performing a filtering operation using a notch filter derived using the estimated frequency of the interference between ringdown signal and the echo signal.

6. The apparatus of claim 1 wherein the transducer is part of a logging string conveyed into the borehole on a wireline.

7. A method of evaluating an earth formation, the method comprising:
   conveying a transducer into a borehole;
   using the transducer to produce a signal including a ringdown signal and an echo from a wall of the borehole from a plurality of orientations; and
   adjusting the signal produced for each of the plurality of orientations using an estimation of the ringdown signal to increase a signal-to-noise ratio associated with the signal and using the adjusted signal to provide a two-dimensional image of the earth formation such that the two-dimensional image is substantially free of a stationary noise resulting from interference between the ringdown signal and the echo.

8. The method of claim 7 wherein adjusting the signal produced for each of the plurality of orientations further comprises:
   (i) fitting a decaying sinusoid to the produced signal for each of the plurality of orientations,
   (ii) subtracting the decaying sinusoid from the produced signal for each of the plurality of orientations to give a plurality of processed signals, and
   (iii) using the plurality of processed signals to provide the two-dimensional image.

9. The method of claim 7 wherein adjusting the signal produced for each of the plurality of orientations further comprises:
   (i) determining an average of the produced signals for the plurality of orientations,
   (ii) subtracting the average of the produced signals from each produced signal for each of the plurality of orientations to give a plurality of processed signals, and (iii) using the plurality of processed signals to provide the two-dimensional image.

10. The method of claim 7 wherein adjusting the signal produced for each of the plurality of orientations further comprises:
   (i) bandpassing the produced signal for each of the plurality of orientations using a modulated Gaussian filter and providing a bandpassed signal for each of the plurality of orientations;
   (ii) estimating an envelope of the bandpassed signal for each of the plurality of orientations;
   (iii) estimating from the envelope of the bandpassed signal for each of the plurality of orientations an arrival time of the echo for each of the orientations and an associated amplitude for each of the plurality of orientations; and
   (iv) producing the image using at least one of: (i) the estimated arrival time for each of the plurality of orientations, and (ii) the estimated associated amplitude for each of the plurality of orientations.

11. The method of claim 7 wherein adjusting the signal produced for each of the plurality of orientations further comprises:
   (i) estimating a frequency of an interference between the ringdown signal and the echo as a function of azimuths, and
   (ii) performing a filtering operation using a notch filter derived using the estimated frequency of the interference between ringdown signal and the echo signal.

12. The method of claim 7 further comprising conveying the transducer on a logging string into the borehole.

13. A non-transitory computer-readable medium product having stored thereon instructions that when executed by at least one processor, cause the at least one processor to perform a method, the method comprising:
   adjusting a signal produced by a transducer in a borehole, the signal including a ringdown signal and an echo from a wall of the borehole from a plurality of orientations, the adjusting using an estimation of the ringdown signal to increase a signal-to-noise ratio associated with the signal, and using the adjusted signal to provide a two-dimensional image of the earth formation such that the two-dimensional image is substantially free of a stationary noise resulting from interference between the ringdown signal and the echo.

14. The non-transitory computer-readable medium product of claim 13 wherein adjusting the signal produced further comprises:
   (i) fitting a decaying sinusoid to the produced signal for each of the plurality of orientations,
   (ii) subtracting the decaying sinusoid from the produced signal for each of the plurality of orientations to give a plurality of processed signals, and
   (iii) using the plurality of processed signals to provide the two-dimensional image.

15. The non-transitory computer-readable medium product of claim 13 wherein adjusting the signal produced further comprises:
   (i) determining an average of the produced signals for the plurality of orientations,
   (ii) subtracting the average of the produced signals from each produced signal for each of the plurality of orientations to give a plurality of processed signals, and
   (iii) using the plurality of processed signals to provide the two-dimensional image.

16. The non-transitory computer-readable medium product of claim 13 wherein adjusting the signal produced further comprises:
   (i) bandpassing the produced signal for each of the plurality of orientations using a modulated Gaussian filter and providing a bandpassed signal for each of the plurality of orientations;
   (ii) estimating an envelope of the bandpassed signal for each of the plurality of orientations;
   (iii) estimating from the envelope of the bandpassed signal for each of the plurality of orientations an arrival time of the echo for each of the orientations and an associated amplitude for each of the plurality of orientations; and
   (iv) producing the image using at least one of: (i) the estimated arrival time for each of the plurality of orientations, and (ii) the estimated associated amplitude for each of the plurality of orientations.

17. The non-transitory computer-readable medium product of claim 13 wherein adjusting the signal produced further comprises:
   (i) estimating a frequency of an interference between the ringdown signal and the echo as a function of azimuths, and
   (ii) performing a filtering operation using a notch filter derived using the estimated frequency of the interference between ringdown signal and the echo signal.

18. The non-transitory computer-readable medium product of claim 13 further comprising at least one of: (i) a ROM, (ii) an EPROM, (iii) an EEPROM, (iv) a flash memory, and (v) an optical disk.

* * * * *